Patented Feb. 13, 1951

2,541,561

UNITED STATES PATENT OFFICE 2,541,561

FERMENTATION PROCESS

Paul Vergnaud, Melle, France, assignor to Les Usines de Melle (Societe Anonyme), Saint-Leger-les-Melle, France, a corporation of France No Drawing. Application January 6, 1948, Serial No. 803. In France January 28, 1947

9 Claims. (Cl. 195—44)

This invention relates to a process for the manufacture of solvents, including butyl alcohol and acetone, by fermentation of amylaceous or sugar-containing substances herein designated as "glucides," and is characterized by conducting the process so that neutralization of acids formed is effected followed by release of such acids with subsequent fermentation to produce such solvents.

The principal object of the invention is to provide a simple, efficient process of the kind described to produce an improved yield under improved conditions of operation.

Other objects will be in part obvious and in part pointed out hereinafter.

The invention accordingly comprises the novel processes and steps of processes, specific embodiments of which are described hereinafter by way of example and in accordance with which I now prefer to practice the invention.

It is known that during the butyl-acetone fermentation of such substances there is observed, during a first stage, a formation of organic acids, especially acetic and butyric acid, at the expense of the glucides.

The concentration of these acids, especially acetic acid and butyric acid, in the wort passes through a maximum which can vary, according to the media, from 1 to 3.5 grams per liter of wort, expressed in terms of sulfuric acid; consequently, upon such concentration being reached, the pH of the medium drops to a variable limit which is generally about pH 4 to 5. When the acidity has reached its maximum, the fermentation products endowed with dissolving properties which I shall hereafter call the "solvents," and espectially acetone and butanol, start to form. Thereupon, the acidity lessens, the pH rises again and the transformation of the sugar into such solvents becomes accelerated. It is known that the organic acids formed during the first stage are transformed into solvents during the period of decrease of the acidity. However a certain quantity of free acid still remains present and the pH, at the end of fermentation, is from 5 to 5.5.

When a culture of butylacetonic organisms is used for insemination of a quantity of wort, the volume with respect to that of the fresh wort, can vary within very wide limits. If the volume of the substance used for insemination, as is generally the case when matter which ferments easily is treated, is small with respect to the volume of the fresh wort to which it is added, the evolution of the acidity during the fermentation is independent of the proportion of material utilized for insemination, everything else remaining otherwise the same.

However, if this proportion of inseminant to wort is very large, for example greater than 20%, the maximum acidity of the wort tends to decrease; also, if the volume of the inseminant is greater than the volume of the fresh wort, the period during which the acidity increases becomes shorter and shorter with less production of acid and may even be entirely eliminated. The course hereinbefore described corresponds to a normal action of the organisms on an easily fermentable raw material.

On the other hand, if one deals with media in which the organism finds it difficult to develop, such as molasses, sugar from pinewood, etc., the stage of decreasing acidity is slow to start and the transformation of the sugar into acid and then into solvents remains slow and may be very incomplete.

To overcome this drawback, it has been suggested to add to such wort, either during its preparation or during its fermentation, neutralizing substances, the effect of which is to maintain, during the fermentation, the pH and accordingly the acidity within limits (which limits depend on the media as well as on the organism used), compatible with the normal exercise of the fermentation functions.

When the dose of neutralizing agent is not too high, there is furthermore observed in this case a decrease of the acidity after a certain time of fermentation, without, however, this acidity becoming nil at the end of the fermentation.

Although this technique makes it possible to utilize raw materials which ferment only with difficulty, it does not lead to a maximum yield of solvents with respect to the glucides used because in such case further quantities of organic acids have a tendency to form at the expense of the glucides.

The present invention makes it possible to avoid this loss in yield in media, where the fermenting organism operates with difficulty and, nevertheless, to take advantage of the favorable action of neutralization. It comprises, after the organic acids have formed and have been partially fixed in the form of salts through combination with a neutralizing agent added for this purpose, introducing an acid in the wort undergoing fermentation, which acid is non-fermentable by the organisms present in the wort, so as to release the organic acids entirely or in part.

This introduction must be effected at such a stage of the fermentation that the artificial acidity thus created is not harmful but, on the contrary, the organic acid released can be transformed rapidly into solvents.

Any acid which cannot ferment, that is to say, that cannot be transformed through biological means under the conditions of fermentation, may be used provided that its anion does not constitute an obstacle, that is to say, provided it does not have any toxic properties at the doses used or that it forms a compound which is insoluble in the medium after it has reacted on the organic salts. In practice, it is preferable to use one or more mineral acids, such as sulfuric acid, phosphoric acid and hydrochloric acid. It is possible, however less advantageous, to use a quantity of acid which is insufficient to release all the organic acids fixed in the form of salts without going beyond the scope of the invention. The expression "nonfermentable acid" as used in the appended claims is intended to define an acid having the characteristics described in this paragraph and to include hydrochloric, sulfuric and phosphoric acids.

The addition of acid may be effected in a continuous or discontinuous manner, at one time or several times, in the form of concentrated acid or of more dilute aqueous solutions or else in the form of acidified solutions of glucides. The selection of one or the other of these methods of addition depends on the equipment available and on the raw materials with which one desires to work.

One method of execution consists in adding the acid after the maximum acidity has become apparent in the neutralized wort. The speed of addition should be such that this maximum acidity cannot be exceeded but such that the entire quantity of acid is introduced before the disappearance of the fermentable glucides. In each particular case, experience indicates the moment and the speed which are most favorable to effect this addition of acid.

A second method is based on the following observation. The utilization of acidified solutions of glucides offers certain advantages. As a matter of fact, it is then possible to place oneself in the situation mentioned above, in which the volume of inoculation product (neutralized wort) is large as compared with the volume of fresh wort (acidified wort). It has been seen that, under these conditions, the natural acidification remains slight or nil; the artificial acidification added to same then remains more easily compatible with the limit which can be tolerated by the organism, which may make it possible to effect in a single step the addition of the acidified wort.

This second method of execution accordingly consists in separating the wort to be treated in two parts. The first part, which must constitute at least 20% of the total volume, receives the neutralizing agent and is inoculated. When its acidity has passed its peak, the second fraction which contains the mineral acid is added.

Finally, certain solutions of glucides are obtained in the industry in acid condition. This is especially the case in connection with juice from Jerusalem artichokes, the glucides of which ferment easily only after they have been subjected to an acid hydrolysis; this is also the case in connection with the sugars obtained by an acid hydrolysis of cellulose substances. Such solutions may be used for the fermentation without it being necessary to subject same to a complete neutralization; it suffices to add them in a suitable amount to a wort during fermentation which has received a suitable quantity of neutralizing agent. This method of proceeding assures a double saving of acid and neutralizing agent.

The invention offers special interest whenever it is desired to work raw materials unfavorable to the life of organisms, among which I mention sugar cane or beet molasses, the sugars obtained through the acid hydrolysis of vegetable substances, whether cellulosic or not, including residual lyes from the manufacture of cellulose. The operations for the preparation of the wort (cooking, sterilization, addition of nutritive substances) are carried out in accordance with processes known per se. Likewise, all the neutralizing substances already recommended for the facilitation of fermentation may be used and their introduction into the wort may be effected at any time before the period of decrease of the acidity of the final wort.

The following examples, which are in no way limitative, will show clearly how the invention can be carried out.

*Examples*

1. In a vat of 12,000 liters, sterilized with steam, there are introduced 10,000 liters approximately of an aqueous solution which contains 40 kgs. of manioc and 40 kgs. of rice finely ground, 500 kgs. of beet molasses and 5 kgs. of diammonium phosphate, this solution being first of all sterilized; then cool to 38° C., inoculate with 1 liter of *B. butylicus* B. F. able to ferment molasses and keep at this temperature.

After 14 hours, the pH of the wort which, at the beginning was 5.5, has dropped to 4.9. Then add a sterile neutralizing 20% solution of sodium carbonate in fractions of 20 liters so as to maintain the pH of the wort between 5.1 and 5.25. There are thus added 120 liters of solution until the 24th hour.

At that time, transfer the contents of this vat, with the customary aseptic precautions, into another vat of 35,000 liters capacity containing about 20,000 liters of a sterile aqueous solution including 1,700 kgs. of molasses and 10 kgs. of diammonium phosphate.

Twenty-eight hours after this transfer, the wort reaches its maximum acidity, namely, 1.6 expressed in grams of sulfuric acid per liter, having a pH of about 4.9 to 5.1.

Beginning with the moment when the acidity of the wort decreases, introduce between the 28th and the 35th hour after said transfer, 40 liters of hydrochloric acid at 22° Bé. in fractions of 10 liters so as to maintain the acidity between 1.5 and 1.6 with a pH of 5.0 to 5.2. At the 40th hour, the fermentation is completed.

The wort, the final acidity of which is 1.5, contains 12.4 grams of solvents per liter; as its volume is 29,720 liters, the quantity of solvents obtained is 33.1 kgs. for 100 kgs. of glucides expressed in saccharose (33.1%).

A similar operation, but without the addition of acid, is completed in 36 hours with a final acidity of 1.3. The wort contains 10.25 grams of solvents per liter for a volume of 32,500 liters, namely, 29.9% of the glucides.

2. In a sterilized vat of 12,000 liters, provided with a mechanical agitator, introduce 8,000 liters approximately of a sterilized aqueous solution containing 500 kgs. of beet molasses, 15 kegs of diammonium phosphate, 40 kgs. of dry yeast and 20 kgs. of finely powdered chalk as a neutralizing agent.

After inoculation with 1 liter of *B. butylicus* B. F. able to ferment molasses and incubation at 38° C. for 37 hours (during which the mass is stirred to maintain the chalk in suspension), this wort is used for the purpose of inoculating about 17,000 liters of a sterile aqueous solution which contains 1,200 kgs. of beet molasses, 10 kgs. of diammonium phosphate. After 15 hours of incubation at 38° C., the acidity of the mixture is equal to 1.9 grams per liter, pH of 4.9.

A second fraction of about 17,000 liters of a sterile aqueous solution, cooled to 38° C. and containing 1200 kgs. of beet molasses, 10 kgs. of diammonium phosphate and 20 kgs. of sulfuric acid at 66° Bé., is added to the above. At the end of the fermentation which occurs 37 hours after the introduction of the second fraction of molasses, the wort contains 1 gram per liter of free acid (pH 5.4) and 11.74 grams of solvent per liter for a volume of 41,750 liters, namely, a yield of 35.2% with respect to the saccharose.

A similar operation, without introduction of acid, only gives 32.5% saccharose.

3. Replace in Example 2 the second fraction of solution of molasses by 17,000 liters of juice of Jerusalem artichokes diluted so as to contain 31 grams of glucides per liter and previously subjected to hydrolysis by cooking under pressure in the presence of 20 kgs. of sulfuric acid and still containing approximately this quantity of such acid, and then cooled to 38° C. Thirty-five hours after the mixing (end of fermentation), there are found in the wort 11 grams of solvent per liter for a volume of 41,500 liters, namely, a yield of 34% of the glucides used.

The quantity of acid used for the hydrolysis and the quantity of hydrolyzed juice were selected, taking into account the quantity of chalk previously introduced into the medium undergoing fermentation, so that the resulting acidity is suitable for conducting the second stage of fermentation, namely, at a pH of about 5.

In another similar operation, the hydrolyzed juice is completely neutralized so that the pH was at 5.5 to 6.0 There is then obtained a yield of 31.5% only of the glucides.

4. Replace in Example 2 the 20 kgs. of sulfuric acid at 66° Bé. by 25 kgs. of pure phosphoric acid. Thirty-seven hours after the introduction of the acid fraction (end of fermentation), there are found in the wort 11.75 grams of solvent per liter for a volume of 41,750 liters, namely, a yield of 35.2% with respect to the saccharose.

As in Example 2, a similar operation, without introduction of acid, only gives 32.5% with respect to the saccharose.

5. Prepare 7,000 liters of an aqueous sterilized butanol-acetone leaven containing 300 kgs. of maize (corn). After inoculation and incubation at 38° C. for 20 hours, inoculate with this leaven about 16,000 liters of a sterile solution containing 840 kgs. of black strap molasses, 7 kgs. of diammonium phosphate and 7 kgs. of pulverized chalk, the solution being contained in a vat where it is subjected to mechanical stirring for 20 hours.

Upon the expiration of 20 hours introduce 18,000 liters of a solution containing 25 grams per liter of sugar obtained by sulfuric acid hydrolysis of pine wood, the solution having been neutralized by lime so as to still contain 0.4 gram of free acid per liter, having a pH of 4.5 to 5, and sterilized. The end of the fermentation occurs 45 hours after the introduction of the wood sugar. There are then obtained 41,100 liters of fermented wort containing 8.4 grams of solvent per liter, which corresponds to 33% of the total glucides used.

If the wood sugar is entirely neutralized in another similar operation, there is only obtained the transformation of 31.9% of the glucides into solvents.

In all the above examples, the solvents obtained consist of approximately 90% butylalcohol + acetone (from 58 to 61% butylalcohol and from 32 to 29% acetone), the remaining 10% comprising mainly isopropylalcohol and ethylalcohol.

Althoug 38° C. is mentioned in each of the above examples as the temperature at which fermentation occurs, this temperature need not be rigidly adhered to but depends mainly on the organisms used. As a way of indication, a range of 36 to 40° C. may be used with *B. butylicus* B. F.

What I claim is:

1. In a process which comprises fermenting a wort containing fermentable glucide and inorganic and nitrogen-containing nutrient materials by means of an organism capable of producing butanol and acetone from said glucide, and partially neutralizing the acid formed during the fermentation, the steps of adding to the fermenting, partially neutralized wort, a quantity of an acid selected from the group consisting of hydrochloric, sulfuric and phosphoric acids such as to liberate said acid formed, said non-fermentable acid being added after the maximum acidity has occurred in the wort subsequent to neutraization and at a speed such that the entire quantity of acid is added before the disappearance of the fermentable glucide, and continuing the fermentation.

2. In a process which comprises fermenting a wort containing fermentable glucide and inorganic and nitrogen-containing nutrient materials by means of an organism capable of producing butanol and acetone from said glucide, and partially neutralizing the acid formed during the fermentation, the steps of adding to the fermenting, partially neutralized wort, a quantity of hydrochloric acid such as to liberate said acid formed, said hydrochloric acid being added after the maximum acidity has occurred in the wort subsequent to neutralization and at a speed such that the entire quantity of hydrochloric acid is added before the disappearance of the fermentable glucide, and continuing the fermentation.

3. In a process which comprises fermenting a wort containing fermentable glucide and inorganic and nitrogen-containing nutrient materials by means of an organism capable of producing butanol and acetone from said glucide, and partially neutralizing the acid formed during the fermentation, the steps of adding to the fermenting, partially neutralized wort, along with further fermentable glucide, a quantity of hydrochloric acid such as to liberate said acid formed, said hydrochloric acid being added after the maximum acidity has occurred in the wort subsequent to neutralization and at a speed such that the entire quantity of hydrochloric acid is added before the disappearance of the fermentable glucide, and continuing the fermentation.

4. A process which comprises, fermenting a wort containing fermentable glucide and inorganic and nitrogen-containing nutrient materials at about 38° C. by means of an organism capable of producing butanol and acetone from said glucide and partially neutralizing the acid formed during the fermentation, whereby there is obtained a fermented wort containing butanol, acetone and salts of butyric and acetic acid having a pH of about 5, introducing this fermented wort into a molasses solution to be fermented, fermenting the mixture at about 38° C. until it reaches a pH of about 4.9, adding hydrochloric acid while maintaining the pH at about 4.9 at a speed such that the entire quantity of acid is added before the disappearance of the fermentable glucide, continuing the fermentation and recovering butanol and acetone therefrom.

5. A process which comprises, fermenting a wort containing fermentable glucide and inorganic and nitrogen-containing nutrient materials at about 38° C. by means of an organism capable of producing butanol and acetone from said glucide and partially neutralizing the acid formed during the fermentation, whereby there is obtained a fermented wort containing butanol, acetone and at least one mineral salt of an organic acid, having a pH of about 5, combining this fermented wort with a further quantity of fermentable glucide, fermenting the mixture at about 38° C. until a pH of about 4.9 is reached, adding a mineral acid selected from the group consisting of hydrochloric, sulfuric and phosphoric acids in such a quantity as to liberate organic acid from the organic salt, the entire quantity of said non-fermentable acid being added before the disappearance of the fermentable glucide, and continuing the fermentation to produce at least one of the substances butanol and acetone.

6. A process which comprises, introducing into a solution containing fermentable glucide and inorganic and nitrogen-containing nutrient materials, an organism capable of producing butanol and acetone from said glucide, fermenting the solution at about 38° C. until the pH drops below 5, gradually mixing therewith an alkaline-reacting substance to bring the pH over 5, combining this solution with a wort containing fermentable glucide, continuing the fermentation at about 38° C. until the pH reaches about 4.7 to 5 and adding a mineral acid selected from the group consisting of hydrochloric, sulfuric and phosphoric acids, gradually to maintain the pH within the range 4.7 to 5 while continuing the fermentation to produce butanol and acetone.

7. A process which comprises, introducing into a solution containing fermentable glucide and inorganic and nitrogen-containing nutrient materials, an organism capable of producing butanol and acetone from said glucide, fermenting the solution at about 38° C. in the presence of an alkaline-reacting substance so that the pH does not drop below 5, combining this solution with a wort containing fermentable glucide, continuing the fermentation at about 38° C. until the pH reaches about 4.7 to 5 and adding a mineral acid selected from the group consisting of hydrochloric, sulfuric and phosphoric acids, gradually to maintain the pH within the range 4.7 to 5 while continuing the fermentation to produce butanol and acetone.

8. A process which comprises, introducing into a solution containing fermentable glucide and inorganic and nitrogen-containing nutrient materials, an organism capable of producing butanol and acetone from said glucide, fermenting the solution at about 38° C. in the presence of an alkaline-reacting substance so that the pH does not drop below 5, combining this solution with a sugar solution obtained by sulfuric acid hydrolysis of wood containing a sufficient quantity of free sulfuric acid to give a pH of about 4.5 to 5 during further fermentation, said solution containing said sulfuric acid being added at a speed such that the entire quantity thereof is added before the disappearance of the fermentable glucide, and continuing the fermentation at about 38° C. under approximately such acid conditions.

9. A process which comprises, dividing a wort containing fermentable glucide into two fractions, one of which is at least 20% of the total wort, fermenting the last-mentioned fraction at about 38° C., in the presence of inorganic and nitrogen-containing nutrient substances by means of an organism capable of producing butanol and acetone from said glucide, partially neutralizing the acid formed therein, then adding to the same the second fraction along with a sufficient quantity of an acid selected from the group consisting of hydrochloric, sulfuric and phosphoric acids to liberate the acid formed, said acid being added at a speed such that the entire quantity thereof is added before the disappearance of the fermentable glucide, and continuing the fermentation at about 38° C.

PAUL VERGNAUD.

REFERENCES CITED

The following references are of record in the file of this patent:

UNITED STATES PATENTS

| Number | Name | Date |
|---|---|---|
| 1,550,746 | Ricard | Aug. 25, 1925 |
| 1,911,399 | Schorger | May 30, 1933 |
| 2,089,522 | Woodruff et al. | Aug. 10, 1937 |

OTHER REFERENCES

Journal of Agriculture, University of Puerto Rico, vol. 18, 1934, pp. 463–466, by Arroyo.